United States Patent [19]
Hagitani et al.

[11] 3,880,823
[45]* Apr. 29, 1975

[54] PROCESS FOR PREPARING PEPTIDES USING N-HYDROXY SUCCINIMIDE MONO- AND DICHLOROACETATE ESTERS

[75] Inventors: Akira Hagitani, Tokyo; Ichiro Muramatsu, Osaka; Shumpei Sakakibara, Kobe; Jinnosuke Abe, Ohhito; Tetsuo Watanabe, Tokyo, all of Japan

[73] Assignee: Toyo Jozo Kabushiki Kaisha, Ohhito, Shizuoka, Japan

[*] Notice: The portion of the term of this patent subsequent to Sept. 14, 1987, has been disclaimed.

[22] Filed: Aug. 24, 1970

[21] Appl. No.: 66,613

Related U.S. Application Data

[63] Continuation-in-part of Ser. No. 667,662, Sept. 14, 1967, Pat. No. 3,541,084.

[30] Foreign Application Priority Data

Sept. 16, 1966 Japan.................................. 41-60768

[52] U.S. Cl.................. 260/112.5; 260/326.14 T; 260/326.44; 260/471 A; 260/481 R; 260/482 R; 260/557 R; 260/558 A, 260/558 S; 260/559 T, 260/559 A, 260/561 A, 260/561 S, 260/561 B, 260/562 N, 260/562 S, 260/262 K, 260/562 P, 260/562 A

[51] Int. Cl..... C07c 103/52; C07g 7/00; C08h 1/00
[58] Field of Search................................. 260/112.5

[56] References Cited
UNITED STATES PATENTS
3,317,559   5/1967   Anderson........................ 260/112.5
3,541,084   11/1970   Hagitani et al. ................. 260/112.5

OTHER PUBLICATIONS
Sakakibara et al., Bull. Chem. Soc. Japan, 37, 1231 (1964).

Primary Examiner—Lewis Gotts
Assistant Examiner—Reginald J. Suyat
Attorney, Agent, or Firm—Sughrue, Rothwell, Mion, Zinn & Macpeak

[57] ABSTRACT

1. A group of new compounds having a general formula:

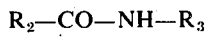

wherein $R_2$ and $R_3$ represent various radicals to be disclosed herein and adapted for use as medicine.

2. A process for the manufacture of said new compounds starting from the material

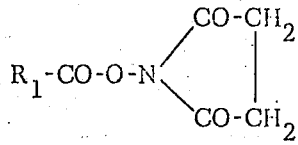

$R_1$ standing for hydrogen, monochloro loweralkyl or dichloro loweralkyl group, through the successive reaction with the compounds having general formula:

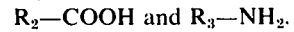

2 Claims, No Drawings

PROCESS FOR PREPARING PEPTIDES USING N-HYDROXY SUCCINIMIDE MONO-AND DICHLOROACETATE ESTERS

CROSS-REFERENCE TO RELATED APPLICATION

The present application is a continuation-in-part of Ser. No. 667,662 filed Sept. 14, 1967, now Pat. No. 3,541,084.

This invention relates to a process for the manufacture of acid amides. It particularly relates to the process for the production of the compound having the acid amide linkage, said compound having the general formula:

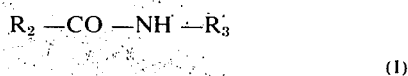

(1)

wherein $R_2$ stands for a member selected from the group consisting of alkyl, cycloalkyl, alkenyl, cycloalkenyl, aryl, aralkyl, arylalkenyl and heterocyclic carboxyl group; these radicals hereinabove defined are substituted or unsubstituted by at least a member selected from the group consisting of halogen, nitro, nitrose, amino, imino, amidino, hydroxy, cycloalkyl, alkoxy, aryloxy, alkoxycarbonyl, alkylcarbonyl, arylcarbonyl, alkylamide, arylamide, alkylthio, alkenyl, cycloalkenyl, alkenylthio, alkenylcarbonyl, aryl, aralkyl, arylalkenyl and heterocyclic group; and $R_3$ stands for a member selected from the group consisting of alkyl, cycloalkyl, aryl, aralkyl, amino, alkylamino, cycloalkylamino, arylamino, aralkylamino, alkylamide, cycloalkylamide, alkenylamide, arylamide, aralkylamide, cyclohexylcarboxyamide and cyclohexylamino group; these radicals are substituted or unsubstituted by at least a member selected from the group consisting of halogen, nitro, alkyl, alkoxy, carboxy, alkylcarbonyl, alkylamino, alkylamide, cycloalkyl, alkoxycarbonyl, cycloalkylamino, cycloalkylcarbonyl, cycloalkylamide, alkenyl, cycloalkenyl, alkenylacarbonyl, alkenylamino, alkenylamide, aryl, aralkyl, arylalkenyl, arylamino, arylamide, arylcarbonyl, aralkylcarbonyl, aralkylamino, aralkylamide and heterocyclic group.

It has been proposed previously to produce aforementioned compounds having the general formula (1), especially to produce peptide compounds. As examples of the process for the production of the said compounds, there may be mentioned, for example, a method of using p-nitrophenylester of acyl amino acids [M. Bodanszky, Ann. N.Y. Acad. Sci., 88, 655 (1960)], N-hydroxyphthalimide's method [G.H.L. Nefkens, et al., J. Am. Chem. Soc., 83, 1263 (1961)], and Anderson's method [G. W. Anderson, et al.: J. Am. Chem Soc.; 86(9), 1839 (1964)]according to which an amino acid, protected in its amino group, is reacted with N-hydroxy succinimide in the presence of dicyclohexyl carbodimide as a dehydrating agent to a succinimide ester:

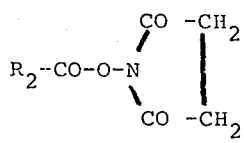

which was then reacted with amino acid to the peptide compound. Among others is known a method by Sakakibara et al. [Bull. Chem. Soc. Japan, 38, 1979 (1965)]. According to this method, trifluoroacetic acid anhydride was reacted with N-hydroxy succinimide to give the ester, i.e. trifluoroacetoxy succinimide, being followed by a synthesis to provide the aforementioned succinimide ester, which was then reacted further with amino acid to the peptide compound.

This last mentioned prior process has a number of grave disadvantages, including that the intermediate product or trifluoroacetoxy succinimide is almost impossible to crystallize and further that this compound and the starting material, the latter being highly poisonous trifluoroacetic acid, are substantially difficult to handle. Also these substances are highly expensive.

The main object of this invention is to provide a process for the production of the compound having acid amide linkage which is useful for a physiologically active agent such as pharmaceuticals and the like.

It is another object of the present invention to provide a process of the above kind, capable of obviating the above mentioned various and grave disadvantages.

In order to realize the above objectives, the process according to this invention in its broadest aspect comprises: reacting a compound having a general formula:

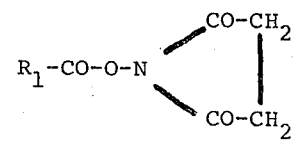

wherein $R_1$ stands for a member selected from the group consisting of hydrogen, monochloro lower alkyl and dichloro lower alkyl group, with a compound having the following general formula:

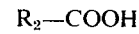

wherein $R_2$ has the same meaning as set forth hereinbefore, to provide the succinimide ester compound having the general formula:

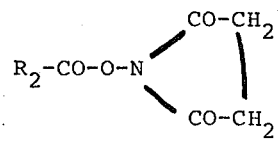

wherein $R_2$ has the meaning set forth above, and subsequently reacting the said succinimide compound with a compound of the following general formula:

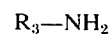

wherein $R_3$ has the same meaning as set forth hereinbefore, thereby to prepare the desired product expressed in the general formula (1).

Comparing with these conventional methods, the process according to the present invention provides a number of industrial advantages; i.e., succinimide ester as expressed in the general formula:

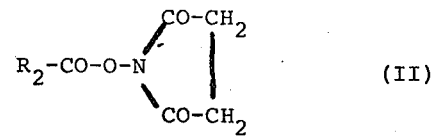

(II)

is easily synthesized from N-hydroxy succinimide ester of the general formula:

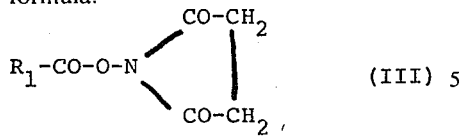

wherein $R_1$ and $R_2$ have respective same meaning as before.

The starting material usable in the novel process is easy to treat, neither hazardous nor expensive.

There is also no necessity for specifically separating the intermediate succinimide ester from reaction mixture, so that the above mentioned compound: $R_3-NH_2$ can be added directly thereto, for obtaining the said final compound having the acid amide linkage.

The compound set forth hereinabove, represented by general formula (III) such as formate ester of N-hydroxy succinimide, monochlorofatty acid ester of N-hydroxy succinimide may be used as starting material. Each of these materials may be prepared by conventional processes, or alternatively by the novel process as disclosed herein.

For carrying out the invention, the process can be carried into effect, for instance, in such a way that an ether solution of formic, monochlorofatty or dichlorofatty acid is partially or completely saturated with ketene to prepare mixed anhydride of acetic acid formic acid, -monochlorofatty acid or -dichlorofatty acid, which is then reacted with N-hydroxy succinimide to prepare the starting material. Ordinarily the said N-hydroxy succinimide-formate ester, N-hydroxy succinimide-monochlorofatty acid ester or N-hydroxy succinimide-dichlorofatty acid ester produced by the aforementioned process may be used even in their crude form non-recrystallized.

The reaction between the said N-hydroxy succinimide ester (III) and the said compound: $R_2-COOH$ (IV) may be conducted, preferably in an inert organic solvent, such as tetrahydrofuran, dimethyl formamide or the like. Generally, 1 to 2 moles of compound (III) are reacted with every mole of compound (IV). It may be preferable that the reaction is carried out in the presence of 1 to 3 moles, per mole of compound (IV), of a basic organic solvent tertiary amine such as trimethylamine, triethylamine, pyridine or the like. Also the reaction may be conducted at a room- or reduced temperature, as may be required. Generally, the temperature may vary between -5° to 20°C. Succinimide ester as expressed by general formula (II) resulting from the reaction between the said compound (III) and the said compound (IV) is separated therefrom and of course can be used in the next following reaction step. It is not always necessary, however, to isolate the compound (II) and so aforementioned compound (I) having the acid amide linkage may be obtained without any separating steps and thus by reacting the said reaction mixture of the said compound (IV) directly with the compound expressed generally as $R_3-NH_2$.

Generally, from 1 to 2 moles of compound (II) is reacted per 1 mole of the compound $R_3-NH_2$, at a temperature of from −2°C to room temperature (i.e., 20°C). The reaction may be conducted in the presence of from 1 to 3 moles of a tertiary organic amine, per mole of the compound $R_3-NH_2$.

Further it is of course necessary to protect or block the radicals $R_1$ and $R_2$ in aforementioned compounds, if such radicals should be decomposed or affected by undesired change. Amino, hydroxy and the like radicals may be mentioned in this case.

The compound (4) prepared by the series of the reaction steps may be extracted if desired at controlled pH with a suitable organic solvent such as ethyl acetate, methyl isobutyl ketone or the like, besides it may be recovered by various conventional processes, which are commonly employed in the separation of organic compounds, such as drying-up in vacuo, crystallization from solvents, chromatographic processing and the like technique.

Examples of compounds which correspond to formulas (III) and (IV) and their reaction product succinimide ester (II), forming part of the instant invention, are enlisted in the following Table 1:

Table 1

| Compound (III) $R_1\text{-CO-O-N}\begin{smallmatrix}\text{CO-CH}_2\\ \text{CO-CH}_2\end{smallmatrix}$ | Compound (IV) $R_2\text{-COOH}$ | Compound (II) $R_2\text{-CO-O-N}\begin{smallmatrix}\text{CO-CH}_2\\ \text{CO-CH}_2\end{smallmatrix}$ |
|---|---|---|
| N-dichloroacetoxy succinimide | acetic acid | N-acetoxy succinimide |
| " | acrylic acid | N-acrylyloxy succinimide |
| " | crotonic acid | N-crotonyloxy succinimide |
| " | cyclohexanecarboxylic acid | N-cyclohexanoyloxy succinimide |
| " | β-cyclohexylacrylic acid | N-β-cyclohexylacrylyloxy succinimide |
| " | carbobenzoxyglycine | N-carbobenzoxyglycyloxy succinimide |
| " | carbobenzoxyvaline | N-carbobenzoxylvalyloxy succinimide |
| " | carbobenzoxy-L-phenylalanine | N-carbobenzoxy-L-phenylalanyloxy succinimide |
| " | carbobenzoxy-D-phenylglycine | N-carbobenzoxy-D-phenylglycyloxy succinimide |
| " | α-methoxyisobutyric acid | N-α-methoxyisobutyloxy succinimide |
| " | phenylacetic acid | N-phenylacetoxy succinimide |
| " | capric acid | N-capryloxy succinimide |
| " | stearic acid | N-stearyloxy succinimide |
| " | cinnamic acid | N-cinnamoyloxy succinimide |
| " | isonicotinic acid | N-isonicotinoyloxy succinimide |
| " | benzoic acid | N-benzoyloxy succinimide |
| " | carbobenzoxy-L-leucine | N-carbobenzoxy-L-leucyloxy succinimide |
| " | phenoxyacetic acid | N-phenoxyacetoxy succinimide |
| " | α-methoxy-3, 4-dichlorophenylacetic acid | N-α-methoxy-3, 4-dichlorophenylacetoxy succinimide |
| " | α-ethyl-phenoxyacetic acid | N-α-ethyl-phenoxyacetoxy succinimide |
| " | 2-ethoxy-1-naphthoic acid | N-2-ethoxy-1-naphthoyloxy succinimide |
| " | thiophene-2-acetic acid | N-thiophene-2-acetoxy succinimide |
| " | α-methylphenoxyacetic acid | N-α-methyl-phenoxyacetoxy succinimide |
| " | 2,4-dichlorophenoxyacetic acid | N-2, 4-dichlorophenoxyacetoxy succinimide |
| " | p-chlorophenylacetic acid | N-p-chlorophenylacetoxy succinimide |
| " | p-methylbenzoic acid | N-p-methylbenzoyloxy succinimide |
| " | p-naphthoic acid | N-2-naphthoyloxy succinimide |
| " | β-5-nitro-2-furfuryl acrylic | N-β-5-nitro-2-furfuryl acrylyloxy |

TABLE 1—Continued

| Compound (III) $R_1\text{-CO-O-N}\begin{smallmatrix}\text{CO-CH}_2\\ \text{\textbar}\\ \text{CO-CH}_2\end{smallmatrix}$ | Compound (IV) $R_2\text{-COOH}$ | Compound (II) $R_2\text{-CO-O-N}\begin{smallmatrix}\text{CO-CH}_2\\ \text{\textbar}\\ \text{CO-CH}_2\end{smallmatrix}$ |
| --- | --- | --- |
| N-monochloroacetoxy succinimide | acid | succinimide |
| " | acetic acid | N-acetoxy succinimide |
| " | acrylic acid | N-acryloxy succinimide |
| " | crotonic acid | N-crotonyloxy succinimide |
| " | cyclohexanecarboxylic acid | N-cyclohexanoyloxy succinimide |
| " | β-cyclohexylacrylic acid | N-β-cyclohexylacrylyloxy succinimide |
| " | carbobenzoxyglycine | N-carbobenzoxyglycyloxy succinimide |
| " | carbobenzoxyvaline | N-carbobenzoxyvalyloxy succinimide |
| " | carbobenzoxy-D-phenylglycine | N-carbobenzoxy-D-phenylglycyloxy succinimide |
| " | α-methoxyisobutyric acid | N-α-methoxyisobutyloxy succinimide |
| " | phenylacetic acid | N-phenylacetoxy succinimide |
| " | capric acid | N-caproyloxy succinimide |
| " | stearic acid | N-stearyloxy succinimide |
| " | cinnamic acid | N-cinnamoyloxy succinimide |
| " | isonicotinic acid | N-isonicotinoyloxy succinimide |
| " | benzoic acid | N-benzoyloxy succinimide |
| " | carbobenzoxy-L-phenylalanine | N-carbobenzoxy-L-phenylalanyloxy succinimide |
| " | carbobenzoxy-L-leucine | N-carbobenzoxy-L-leucyloxy succinimide |
| " | phenoxyacetic acid | N-phenoxyacetoxy succinimide |
| " | α-methoxy-3,4-dichlorophenylacetic acid | N-α-methoxy-3,4-dichlorophenylacetoxy succinimide |
| " | α-ethyl-phenoxyacetic acid | N-α-ethyl-phenoxyacetoxy succinimide |
| " | 2-ethoxy-1-naphthoic acid | N-2-ethoxy-1-naphthoyloxy succinimide |
| " | thiophene-2-acetic acid | N-thiophene-2-acetoxy succinimide |
| " | α-methylphenoxyacetic acid | N-α-methyl-phenoxyacetoxy succinimide |
| " | 2,4-dichlorophenoxyacetic acid | N-2,4-dichlorophenoxyacetoxy succinimide |
| " | p-chlorophenylacetic acid | N-p-chlorophenylacetoxy succinimide |
| " | p-methylbenzoic acid | N-p-methylbenzoyloxy succinimide |
| " | 2-naphthoic acid | N-2-naphthoyloxy succinimide |
| " | β-5-nitro-2-furfuryl acrylic acid | N-β-5-nitro-2-furfuryl acrylyloxy succinimide |
| N-α-monochloropropionyl succinimide | acetic acid | N-acetoxy succinimide |
| " | acrylic acid | N-acryloxy succinimide |
| " | crotonic acid | N-crotonyloxy succinimide |
| " | cyclohexanecarboxylic acid | N-cyclohexanoyloxy succinimide |
| " | β-cyclohexylacrylic acid | N-β-cyclohexylacrylyloxy succinimide |
| " | carbobenzoxyglycine | N-carbobenzoxyglycyloxy succinimide |
| " | carbobenzoxyvaline | N-carbobenzoxyvalyloxy succinimide |
| " | carbobenzoxy-D-phenylglycine | N-carbobenzoxy-D-phenylglycyloxy succinimide |
| " | β-methoxyisobutyric acid | N-α-methoxyisobutyloxy succinimide |
| " | phenylacetic acid | N-phenylacetoxy succinimide |
| " | capric acid | N-caproyloxy succinimide |
| " | stearic acid | N-stearyloxy succinimide |
| " | cinnamic acid | N-cinnamoyloxy succinimide |
| " | isonicotinic acid | N-isonicotinoyloxy succinimide |
| " | benzoic acid | N-benzoyloxy succinimide |
| " | carbobenzoxy-L-phenylalanine | N-carbobenzoxy-L-phenylalanyloxy succinimide |
| " | carbobenzoxy-L-leucine | N-carbobenzoxy-L-leucyloxy succinimide |
| " | phenoxyacetic acid | N-phenoxyacetoxy succinimide |
| " | α-methoxy-3,4-dichlorophenylacetic acid | N-α-methoxy-3,4-dichlorophenylacetoxy succinimide |
| " | α-ethyl-phenoxyacetic acid | N-α-ethyl-phenoxyacetoxy succinimide |
| " | 2-ethoxy-1-naphthoic acid | N-2-ethoxy-1-naphthoyloxy succinimide |
| " | thiophene-2-acetic acid | N-thiophene-2-acetoxy succinimide |
| " | α-methylphenoxyacetic acid | N-α-methyl-phenoxyacetoxy succinimide |
| " | 2,4-dichlorophenoxyacetic acid | N-2,4-dichlorophenoxyacetoxy succinimide |
| " | p-chlorophenylacetic acid | N-p-chlorophenylacetoxy succinimide |
| " | p-methylbenzoic acid | N-p-methylbenzoyloxy succinimide |
| " | 2-naphthoic acid | N-2-naphthoyloxy succinimide |
| " | β-5-nitro-2-furfuryl acrylic acid | N-β-5-nitro-2-furfuryl acrylyloxy succinimide |
| N-formoxy succinimide | acetic acid | N-acetoxy succinimide |
| " | acrylic acid | N-acryloxy succinimide |
| " | crotonic acid | N-crotonyloxy succinimide |
| " | cyclohexanecarboxylic acid | N-cyclohexanoyloxy succinimide |
| " | β-cyclohexylacrylic acid | N-β-cyclohexylacrylyloxy succinimide |
| " | carbobenzoxyglycine | N-carbobenzoxyglycyloxy succinimide |
| " | carbobenzoxyvaline | N-carbobenzoxyvalyloxy succinimide |
| " | carbobenzoxy-D-phenylglycine | N-carbobenzoxy-D-phenylglycyloxy succinimide |
| " | β-methoxyisobutyric acid | N-α-methoxyisobutyloxy succinimide |
| " | phenylacetic acid | N-phenylacetoxy succinimide |
| " | capric acid | N-caproyloxy succinimide |
| " | stearic acid | N-stearyloxy succinimide |
| " | cinnamic acid | N-cinnamoyloxy succinimide |
| " | isonicotinic acid | N-isonicotinoyloxy succinimide |
| " | benzoic acid | N-benzoyloxy succinimide |
| " | carbobenzoxy-L-phenylalanine | N-carbobenzoxy-L-phenylalanyloxy succinimide |
| " | carbobenzoxy-L-leucine | N-carbobenzoxy-L-leucyloxy succinimide |
| " | phenoxyacetic acid | N-phenoxyacetoxy succinimide |
| " | α-methoxy-3,4-dichlorophenylacetic acid | N-α-methoxy-3,4-dichlorophenylacetoxy succinimide |
| " | α-ethyl-phenoxyacetic acid | N-α-ethyl-phenoxyacetoxy succinimide |
| " | 2-ethoxy-1-naphthoic acid | N-2-ethoxy-1-naphthoyloxy succinimide |
| " | thiophene-2-acetic acid | N-thiophene-2-acetoxy succinimide |
| " | α-methylphenoxyacetic acid | N-αmethyl-phenoxyacetoxy succinimide |
| " | 2,4-dichlorophenoxyacetic acid | N-2,4-dichlorophenoxyacetoxy succinimide |
| " | p-chlorophenylacetic acid | N-p-chlorophenylacetoxy succinimide |
| " | p-methylbenzoic acid | N-p-methylbenzoyloxy succinimide |
| " | 2-naphthoic acid | N-2-naphthoyloxy succinimide |
| " | β-5-nitro-2-furfuryl acrylic acid | N-β-5-nitro-2-furfuryl acrylyloxy succinimide |

The following preparations illustrate several modes of preparing succinimide ester (II) in the present invention.

PREPARATION 1

N-acetoxy succinimide 2 ml of dimethyl formamide were added to a mixture of 0.3 g of acetic acid (5m mole) and 1.7 g of N-dichloroacetoxy succinimide (7.5m mole). with stirring at 0°C, 1.43 ml of triethylamine were added dropwise thereto. After stirring for about further 2 hours at room temperature, pH was adjusted to 6–7 by adding 15 ml of a mixture of water and IN-hydrochloric acid. The thus precipitated crystals were filtered off. The products: N-acetoxy succinimide, colorless crystals.

Yield: 0.4 g. (recovery: 51%)
m.p.: found; 131–133°C;
reference; 130°C
Elemental analysis:

found;   C;45.99%, H;4.63%, N;8.96%
theoretical as based upon $C_6H_7NO_4$
   C;45.86%, H;4.49%, N;8.91%

PREPARATION 2

N-carbobenzoxyglycyloxy succinimide 2 ml of tetrahydrofuran were added to a mixture of 1.05 g of carbobenzoxyglycine (5 m mole) and 2.26 g of N-dichloroacetoxy succinimide (10 m mole). To this solution 1 ml of triethylamine was added with stirring. The mixture was stirred for a further 1 hour at room temperature. After finishing the reaction, water was added, cooled, then filtered, and solid material recovered was washed with water. This material was dissolved in methylenechloride, and dried with anhydrous sodium sulfate. After removal of the drying agent by filtration, an addition of diethylether resulted in the precipitation of N-carbobenzoxyglycyloxy succinimide as crystal.

Yield: 1.10 g (recovery: 73%)
m.p.: found; 115°C;
reference; 114°C
Elemental analysis:

found;   C;54.95%, H;4.65%, N;9.31%
theoretical as based upon $C_{14}H_{14}N_2O_6$
   C;54.90%, H;4.57%; N;9.15%

PREPARATION 3

N-carbobenzoxyglycyloxy succinimide

To a solution of 1.05 g of carbobenzoxyglycine (5 m. mole) and 2 g of N-monochloroacetoxy succinimide (ca. 10 m mole) in 1 ml of tetrahydrofuran was added dropwise 1 ml of trimethylamine (7.2 m mole) with stirring. The reaction was allowed to continue for 2 hours. Following the reaction, the precipitated reaction product was filtered after addition of 25 ml of water under cooling, then washed with water. The precipitated material was recrystallized from ethanol-ether mixture, yielding N-carbobenzoxyglycyloxy succinimide in white crystals.

Yield: 750 mg (recovery: 49%)
m.p.: found; 112.5–113.5°C;
reference: 113–114°C

PREPARATION 4

N-carbobenzoxyglycyloxy succinimide

The triethylamine in Preparation 3, was replaced by pyridine to produce N-carbobenzoxyglycyloxy succinimide as white crystals.

Yield: 342 mg (recovery: 23%)
m.p.: 111°–113°C

PREPARATION 5

8.4 ml of triethylamine (60 m mole) were added dropwise to a cooled, stirred solution of 4.08 g of phenylacetic acid (30 m mole) and 10.2 g of N-dichloroacetoxy succinimide (45 m mole) in 6 ml of dimethylformamide. The solution was stirred for about 2 hours and then an excess amount of water was added. The mixture was allowed to stand overnight. After cooling the thus precipitated crystals were separated by filtration, washed with water repeatedly, yielding 5.55 g of crude crystal of N-phenylacetoxy succinimide (recovery: 79%), which was recrystallized as colorless crystals from ethylether.

Yield: 4.15 g (recovery: 60%)
m.p.: 118°–119°C
Elemental analysis:

found;   C;62.08%, H;4.85%, N;5.92%
theoretical as based upon $C_{12}H_{12}NO_{14}$;
   C;61.80% H;4.76%, N;6.01%

PREPARATION 6

N-capryloxy succinimide 1.05 ml of triethylamine were added dropwise with stirring to a cooled solution of 0.86 g of n-capric acid (5 m mole) and 1.7 g of N-dichloroacetoxy succinimide (7.5 m mole) in 2 ml of dimethylformamide. The mixture was then stirred in an ice bath for about 1 hour, and then 15 ml chilled water was added, the reaction mixture was then cooled and the precipitated crystals were separated. This precipitated material was recrystallized from isoprophylalcholethylacetate mixture.

Yield: 500 mg (recovery: 37%)
m.p.: 59°–61°C
Elemental analysis:

found;   C;62.90%, H;9.10%, N;5.28%
theoretical as based upon $C_{14}H_{25}NO_4$
   C;62.44%, H;8.61%, N;5.20%

PREPARATION 7

N-carbobenzoxy-L-phenylalanyloxy succinimide 1.05 ml of triethylamine were added dropwise with cooling to a mixture of 1.2 g of carbobenzoxy-L-phenylalanine (4 m mole) and 1.36 g of N-dichloroacetoxy succinimide (6 m mole) in 2 ml of dimethylformamide. The mixture was stirred with cooling, followed by addition of 15 ml of water, then the sedimented crystals were separated therefrom. N-carbobenzoxy-L-phenylalanyloxy succinimide was recrystallized from isopropyl alcohol.

Yield: 670 mg (recovery: 42%)
m.p.: 130°–133°C

PREPARATION 8

N-stearyloxy succinimide 1.05 ml of triethylamine were added dropwise to a cooled, stirred mixture of 1.42 g of stearic acid (5 m mole) and 1.7 g of N-dichloroacetoxy succinimide (7.5 m mole) in 6 ml of dimethylformamide. The solution was stirred for about 1 hour with cooling, and then added with 24 ml of water. The precipitated crystals of N-stearyloxy succinimide were separated, which were finally recrystalized from isopropyl alcohol.

Yield: 1.16 g (recovery: 61%)
m.p.: 88°–90°C
Elemental analysis:

found: C;69.62%, H;10.82%, N;3.94%
theoretical as based upon $C_{22}H_{39}NO_4$
C;69.25%, H;10.30%, N;3.67%

PREPARATION 9

N-cinnamoyloxy succinimide 1.43 ml of triethylamine were added to a mixture of 0.7 g of cinnamic acid 5 m mole) and 1.7 g of N-dichloroacetoxy succinimide (7.5 m mole) in 2 ml of dimethylformamide, stirring for about 1 hour, followed by addition of 10 ml of water. The solution was neutralized with 1 N-HCl and cooled, thereby separating the sedimented crystals and washed with water. The precipitated material was recrystalized from isopropyl alcoholethyl acetate.

Yield: 450 mg (recovery: 37%)
m.p.: 173°–175°C
Elemental analysis:

found; C;62.40%, H;4.29%, N;5.47%
theoretical as based upon $C_{13}H_{11}NO_4$
C;63.67%, H;4.53%, N;5.71%

PREPARATION 10

N-benzoyloxy succinimide 1.05 ml of triethylamine were added dropwise to a solution of 0.61 g of benzoic acid (5 m mole) and 1.7 g of N-dichloroacetoxy succinimide (7.5 m mole) in 2 ml of dimethylformamide. The solution was stirred for about 2 hours with cooling, adding 15 ml of water, standing in an ice bath, and then separating the precipitated crystals of N-benzoyloxy succinimide.

Yield: 500 mg (recovery: 46%)
m.p.: 133°–135°C
Elemental analysis:

found; C;60.27%, H;4.19%, N;6.57%
theoretical as based upon $C_{11}H_9NO_4$
C;60.27%, H;4.14%, N;6.39%

PREPARATION 11

N-carbobenzoxy-D-phenylglycyloxy succinimide 1.05 ml of triethylamine were added dropwise with stirring to a cooled solution of 1.43 g of carbobenzoxy-D-phenylglycine (5 m mole) and 1.7 g of N-dichloroacetoxy succinimide (7.5 m mole) in 2 ml of dimethylformamide. The solution was then stirred for 2 hours in an ice bath, adding an equal volume of chilled water and then precipitated crystals thus separated. The recrystalization was performed from isopropyl alcohol, thus obtained N-carbobenzoxy-D-phenylglycyloxy succinimide as white needle crystal.

Yield: 610 mg (recovery: 32%)
m.p.: 144°–146°C
Elemental analysis:

found; C;63.31%, H;4.86%, N;7.45%
theoretical as based upon $C_{20}H_{18}N_2O_6$
C;62.82%, H;4.75%, N;7.33%

Compounds, which are represented by formula (II), formula $R_3$—$NH_2$ and compound having acid amide linkage as formula (I) are shown in the following Table 2.

Table 2

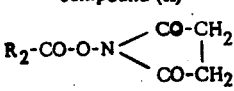

| succinimide ester compound (II) $R_2-CO-O-N{\scriptsize\begin{array}{c}CO-CH_2\\|\\CO-CH_2\end{array}}$ | $R_3 - NH_2$ | compound having acid amide linkage compound (I) $R_2-CO-NH-R_3$ |
|---|---|---|
| N-carbobenzoxyglycyloxy succinimide | glycine ethyl ester | carbobenzoxyglycylglycine ethyl ester |
| N-δ-carbobenzoxyamino valeroyloxy succinimide | δ-aminovaleric acid methyl ester | δ-carbobenzoxy aminovaleryl- -amino-valeric acid methyl ester |
| N-carbobenzoxy-L-phenylalanyloxy | glycine ethyl ester | carbobenzoxy-L-phenylalanyl-glycine ethyl ester |
| N-carbobenzoxy-L-leucyloxy succinimide | glycine ethyl ester | carbobenzoxy-L-leucylglycine ethyl ester |
| '' | L-phenylalanyl glycylethyl ester | carbobenzoxy-L-leucyl-L-phenylalanylglycine ethyl ester |
| N-phenylacetoxy succinimide | 6-aminopenicillanic acid | benzyl penicillin |
| N-α-ethyl-phenoxyacetoxy succinimide | 6-aminopenicillanic acid | phenoxypropyl penicillin |
| N-α-methoxy-3,4-dichlorophenylacetoxy succinimide | 6-aminopenicillanic acid | 3,4-dichloro-α-methoxybenzyl penicillin |
| N-2-ethoxy-1-naphthoyloxy succinimide | 6-aminopenicillanic acid | 2-ethoxy-1-naphthyl penicillin |
| N-thiophene-2-acetoxy succinimide | 7-aminocephalosporanic acid | cephalotin |
| N-α-methyl-phenoxyacetoxy succinimide | 6-aminopenicillanic acid | phenoxyethyl penicillin |
| N-carbobenzoxy-D-phenylglycyloxy succinimide | 6-aminopenicillanic acid | α-aminobenzyl penicillin |
| N-acetoxy succinimide | n-hexylamine | N-n-hexylacetamide |
| '' | benzylamine | N-benzylacetamide |
| '' | allylamine | N-allylacetamide |
| '' | 2-aminopyridine | N-2-pyridylacetamide |
| '' | 2-amino-5-nitrothiazole | N-5-nitro-2-thiazolyl acetamide |
| '' | phenylhydrazine | N-phenylaminoacetamide |
| N-dichloroacetoxy succinimide | p-chloroaniline | N-p-chlorophenyl dichloroacetamide |
| N-propionyloxy succinimide | aniline | N-phenylpropionamide |

TABLE 2—Continued

| succinimide ester compound (II)  $R_2\text{-CO-O-N}\begin{array}{c}\text{CO-CH}_2\\|\\\text{CO-CH}_2\end{array}$ | $R_3 - NH_2$ | compound having acid amide linkage compound (I)  $R_2\text{-CO-NH-}R_3$ |
|---|---|---|
| N-cyclohexanecarbonyloxy succinimide | cyclohexylamine | N-cyclohexylcyclohexane carboxamide |
| N-phenylacetoxy succinimide | benzylamine | N-benzylphenylacetamide |
| N-benzoyloxy succinimide | p-anisidine | N-p-methoxyphenyl benzamide |
| N-phenylacetoxy succinimide | cyclohexylamine | N-cyclohexyl phenylacetamide |
| N-2,4-dichlorophenoxyacetoxy succinimide | 3,4-dichloroaniline | N-3,4-dichlorophenyl-2,4-dichlorophenoxyacetamide |
| N-p-chlorophenylacetoxy succinimide | p-chloroaniline | N-p-chlorophenyl p-chlorophenyacetamide |
| N-p-methylbenzoyloxy succinimide | p-toluidine | N-p-methylphenyl p-methylbenzamide |
| N-2-naphthoyloxy succinimide | n-butylamine | N-n-butyl-2-naphthamide |
| N-2-naphthoyloxy succinimide | β-phenylethylamine | N-β-phenylethyl-2-naphthamide |
| N-phenoxyacetoxy succinimide | benzylamine | N-benzylphenoxy acetamide |
| N-acrylyloxy succinimide | isopropylamine | N-isopropyl acrylamide |
| N-isonicotinoyloxy succinimide | 2-aminothiazole | N-2-thiazolyl isonicotinamide |
| Nβ-5-nitro-2-furfurylacryloxy succinimide | benzylamine | N-benzyl-β-5-nitro-2-furfuryl acrylamide |
| N-phenylacetoxy succinimide | morpholine | N-phenylacetyl morpholine |
| N-isonicotinoyloxy succinimide | isopropylhydrazine | N-isopropylamino isonicotinamide |
| N-p-chlorophenoxyacetoxy succinimide | phenylhydrazine | N-phenylamino-p-chloro phenoxyacetamide |
| N-acetoxy succinimide | p-aminobenzoic acid ethyl ester | N-p-ethoxycarbonyl phenylacetamide |
| N-hippuropyloxy succinimide | aniline | benzoylglycine anilide |
| N-β-chloropropionyloxy succinimide | benzylamine | N-benzylβ-chloropropionamide |

The compounds produced by the present process are useful as therapeutic agents for the treatment of various types of bacterial infections. Specifically, the present process is useful for the production of oxytocin, which is known as a stimulant of uterine contraction (See, for example, U.S. Pat. Nos. 2,938,891 and 3,076,797). The production of oxytocin by the present process is as follows:

EXAMPLE OF PREPARATION OF OXYTOCIN 25 ml of a 25%-solution of hydrogen bromide in acetic acid was added to 7.0 g of N-carbobenzoxy leucyl glycine ethyl ester (hereinafter abbreviated to "Cbz-Leu-GlyOEt") and the mixture was reacted for 30 minutes at room temperature, then 450 ml of dry ethyl ether was added thereto.

The precipitated oil was separated by decantation and then dissolved in 40 ml of $CHCl_3$, with 6 ml of triethylamine (referred to as "TEA" hereinafter).

To the solution, 7.0 g of N-carbobenzoxyproline N-oxysuccimide ester (to be abbreviated hereinafter to "Cbz-Pro-NHS") were added and left overnight for reaction at room temperature. After completion of the reaction, 150 ml of $CHCl_3$ were further added thereto and the reaction mixture was washed successively with 1N-$NaHCO_3$, $H_2O$, 1N-HCl and $H_2O$, respectively. After removal of the solvent by drying, the reaction products were recrystallized from ethyl acetate, to obtain carbobenzoxyprolyl leucyl glycine ethyl ester. Yield: 7.0 g; Recovery: 76%; m.p. 151°–152°C; $[\alpha]_D^{23} = -82 - 8$ (C 2.5 EtOH).

90 g of N-carbobenzoxyprolyl leucyl glycine ethyl ester (hereinafter referred to briefly as "Cbz-Pro-Leu-GlyoEt") were dissolved in 1.5 lit. of methanol and $NH_3$ gas was introduced into the solution at 0°C for 2 hours. The reaction mixture was left stationary at room temperature for 5 hours, the solvent was distilled off and the reaction products were recrystallized from ethyl acetate to provide carbobenzoxy prolyl leucyl glycinamide (hereinafter referred to briefly as "Cbz-Pro-Leu-Gly-$NH_2$"). Yield: 76.5 g; Recovery: 91.5%; m.p. 162°–164°C.

7.0 g Cbz-Pro-Leu-Gly-$NH_2$ was added to 25 ml of a 25%-solution of HBr in acetic acid and reacted at room temperature for 30 minutes, thereafter 450 ml of dry ethyl ether was added and the resulting oil was removed from the solvent by decantation, $CHCl_3$ and 5 ml of TEA were added to the separated oil.

To the solution thus obtained, 7.5 g of N-carbobenzoxy-S-benzyl cystein N-oxysuccinimide ester (hereinafter referred to as

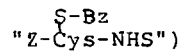
"Z-Cys-NHS")

were added and the mixture was left stationary overnight at room temperature for reaction. After the reaction, $CHCl_3$ was additionally introduced and the mixture was washed successively with 1N-$NaHCO_3$; $H_2O$; 1N-HCl and $H_2O$. Then, the solvent was distilled off to provide N-carbobenzoxy-S-benzyl cysteinyl proly leucyl glycinamide (to be referred to hereinafter briefly as

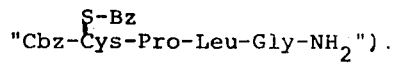
"Cbz-Cys-Pro-Leu-Gly-$NH_2$").

Yield: 12.6g; Recovery 85%.
12.0 g of

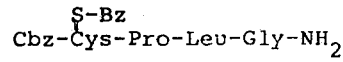
Cbz-Cys-Pro-Leu-Gly-$NH_2$ were suspended in 25 ml of acetic acid and 50 ml of a 25%-solution of HBr in acetic acid, and then the reaction mixture was left stationary at room temperature for an hour. Then, 400 ml of dry ethyl ether were added. The sedimented products were washed carefully with ethyl ether and dissolved in dimethylformamide (referred to hereinafter as "DMF"), TEA was added and the resulting mixture was reacted with 7.7 g of carbobenzoxy asparagine N-oxysuccinimide ester (to be called briefly as

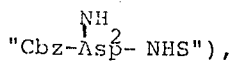

by agitating at room temperature for 2 days and then adding ethyl acetate. The separated sedimentation products were filtered. The reaction product amounted to 13 g. m.p. : 213°–214°C. $[\alpha]_D^{21}$ —60 (C = 1, DMF).

2.9 g of

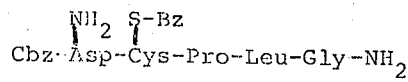

dissolved in 30 ml of acetic acid was added thereto along with 30 ml of a 25%-solution of HBr in acetic acid and reacted at room temperature for an hour, and then 450 ml of dry ethyl ether was added.

The separated sedimentation was dissolved in 9 ml of DMF and 2.6 ml of TEA was added and then reacted with 2g of

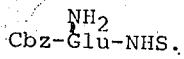

The mixture was reacted overnight under stirring at room temperature, and then ethyl acetate was added. The thus precipitated product was filtered and washed with ethanol and ethyl acetate, respectively to obtain 3g (recovery; 90%) of the precipitate.

7.0g of the thus-obtained

The thus-obtained precipitate was dissolved in 85 ml of dimethylformamide, and 9 ml of triethylamine were added thereto and reacted with 6.0 g of

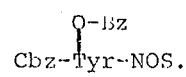

After the reaction continued for 20 hours at room temperature, 450 ml of ethyl acetate were added. Thus, 11 g (Recovery 91%) of precipitate were obtained.

The precipitate was suspended in 40 ml of acetic acid, and 60 ml of 25% HBr in acetic acid was added; the reaction was continued for 2 hours at room temperature. After the reaction, dry ethyl ether was added to produce a precipitate.

The precipitate was dried a short time over $CaCl_2$ and NaOH, and then dissolved in 60 ml of dimethylformamide; 5–6 ml of triethylamine was added and the mixture was reacted with

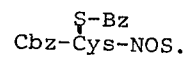

The reaction was continued for 3 days with stirring.

After completion of the reaction, 200 ml of ethyl acetate were added. The produced precipitate was washed with 400 ml of ethanol and 50 ml of ethyl acetate respectively. Yield: 7.3 g (Recovery: 92%). m.p. 237°–241°C.

100 mg of

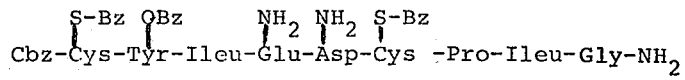

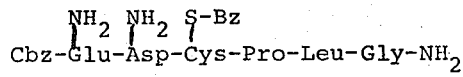

was dissolved in 50 ml of ethyl acetate and treated with 65 ml of a 25% solution of HBr in acetic acid. The solution was reacted for two hours at room temperature, and then dry ethyl ether was added thereto. The obtained precipitate was dissolved in 20 ml of DMF, and 6–7 ml of TEA was added, reacted with 4.0 g of Cbz-Ileu (i.e. isoleucyl)-NOS overnight at room temperature. After completion of the reaction, 300 ml of ethyl acetate were added to obtain the precipitate. Yield: 8.0 g (Recovery: 90%).

9.0 of

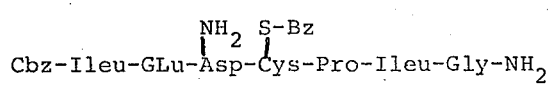

were dissolved in 50 ml of acetic acid, and 50 ml of a 25% solution of HBr in acetic acid was added thereto. The solution was reacted for 2 hours at room temperature, and then dry ethyl ether was added thereto.

and 0.1 ml of anisol were dissolved in 2 ml of anhydrous hydrogen fluoride. The solution was held for 1 hour at room temperature, and then hydrogen fluoride was removed in vacuo and dried with methanol. The thus obtained substance was dissolved in 100 ml of $H_2O$, and the pH was adjusted to 6.5 with aqueous ammonia for 2 hours. Next, the pH of the substance was further adjusted to 4 with acetic acid.

The solution showed an oxytocin property ranging from 13,000 to 14,000 units, in uterine contraction experiments with mice.

When the solution was passed through an ion-exchange resin (Dow 50) to freeze-dry the peptide-fractions, 20 mg of solid were obtained.

The following examples are set forth for purposes of illustration only and are not to be construed as limiting the scope of the invention.

EXAMPLE 1

Carbobenzoxyglycylglycine ethyl ester 1 ml of triethylamine (7 m mole) was added dropwise to a cold solution of 1.05 g of carbobenzoxyglycine (5 m mole) and 1.55 g of N-dichloroacetoxy succinimide (7 m mole) in 3 ml of dimethylformamide. After 2 hours 0.07 ml of water was added, stirring for several minutes, and then a mixture of 0.7 g og glycine ethyl ester hydrochloride (5 m mole), 0.7 ml of triethylamine (5 m mole), 3 ml of dimethylformamide and 0.55 ml of water was added thereto. The reaction was allowed to continue for 1 hour with stirring. After adding 20 ml of chilled water, allowed to stand in an ice bath, the solution was extracted twice with ethyl acetate. This ethyl acetate extract was combined with additional ethyl acetate extract and the combined extracts containing the product were washed with 10% solution of sodium bicarbonate, 1 N-hydrochloric acid and water respectively, and dried over anhydride sodium sulfate. After removal of the drying agent by filtration, the extract was dried up in vacuo. The residue was recrystallized from water containing ethanol to obtain crystals of carbobenzoxyglycine ethyl ester.

Yield: 1.08 g (recovery: 73%)
m.p.: found; 81°–82°C; reference; 80°–81°C
Elemental analysis:

found;   C;57.30%, H;6.21%, N;9.54%
theoretical as based upon $C_{24}H_{18}N_2O_5$
C;57.21%, H;6.16%, N;9.52%

EXAMPLE 2

The procedure of Example 1 was again followed substantially in every detail except that the dimethylformamide was replaced by tetrahydrofuran to obtain the same product as crystals in Example 1.

Yield: 1.05 g (recovery: 71%)
m.p.: 80°–82°C

EXAMPLE 3

δ-carbobenzoxy aminovaleryl aminovaleric acid methyl ester 1 ml of triethylamine was added dropwise with stirring to a cooled solution of 1.26 g of δ-carbobenzoxy aminovaleric acid (5 m mole) and 1.58 g of N-dichloroacetoxy succinimide (7 m mole) in 3 ml of dimethylformamide. The mixture was stirred in an ice bath for about 4 hours, followed by an addition of 0.07 ml of water, and then kept in cooled condition for further 40 minutes. Next, the mixed solution of 0.85 g of δ-aminovaleric acid methylester hydrochloride (ca. 5 m mole), 0.7 ml of triethylamine (5 m mole) and 4 ml of dimethylformamide were added thereto with cooling, while stirring for 2.5 hours. The mixture was allowed to stand overnight, then added with 30 ml of water and extracted with ethyl acetate. The ethyl acetate extract was washed with sodium bicarbonate solution, diluted with hydrochloric acid and water respectively and dried over anhydrous sodium sulfate. After removal of the drying agent by fitration, the extract was condensed in vacuo. The sedimented material was separated, washed with ether, dried in desiccator, thus obtaining the product in white crystals.

Yield: 1.37 g (recovery: 75%)
m.p.: 94°–96°C
Elemental analysis:

found;   C;62.87%, H;7.83%, N;7.80%
theoretical as based upon $C_{19}H_{28}N_2O_5$
C;62.62%, H;7.74%, N;7.69%

EXAMPLE 4

Carbobenzoxy-L-phenylalanylglycine ethyl ester 1.07 ml of triethylamine were added dropwise with cooling to a mixture of 1.5 g of carbobenzoxy-L-phenylalanine (5 m mole) and 1.96 g of N-dichloroacetoxy succinimide (7.5 m mole) in 3 ml of dimethylformamide. After 2 hours, 0.07 ml of water was added with stirring for few minutes, further a mixed solution of glycine ethyl ester hydrochloride (5 m mole) 7 ml of dimethylformamide and 0.7 ml of triethylamine was added thereto and the mixture was stirred for further 2 hours.

After the reaction, 20 ml of water was added and the mixture was extracted with ethyl acetate. The ethyl acetate phase was separated, washed with a 10%-solution of sodium bicarbonate, and diluted with hydrochloric acid and water, then dried with anhydrous sodium sulfate, followed by condensation in vacuo to obtain the product in while crystals.

Yield: 1.55 g (recovery: 81%)
m.p.: found; 108°–111°C; reference; 110°–111°C
Optical rotation:

found;       $[\alpha]_D^{20} = -16.8°$ (c=2.238, ethanol)
reference;   $[\alpha]_D^{20} = -16.9°$ (c=5, ethanol)

Elemental analysis:

found;   C;66.30%, H;6.25%, N;7.33%
theoretical as based upon $C_{21}H_{24}N_2O_5$
C;65.73%, H;6.19%, N;7.28%

EXAMPLE 5

Carbobenzoxy-L-leucylglycine ethyl ester 2.28 ml of triethylamine were added dropwise with stirring to a cold mixture of 2.65 g of carbobenzoxy-L-leucine (10 m mole) and 3.39 g of N-dichloroacetoxy succinimide (15 m mole) in 3 ml of dimethylformamide. The mixture was stirred for 3 hours, and then added with 0.14 ml of chilled water with continuous cooling and stirring. To this solution, a mixture of 1.39 g of glycine ethyl ester hydrochloride (10 m mole), 14 ml of dimethylformamide and 1.43 ml of triethylamine was added. This reaction mixture was then stirred for further 3 hours. After adding chilled water, the solution was in vacuo. The residue was recrystallized from water containing ethanol to obtain crystals of carbobenzoxyglycine ethyl ester.

Yield: 1.08 g (recovery: 73%)
m.p.: found; 81°–82°C; reference; 80°–81°C
Elemental analysis:

found;   C;57.30%, H;6.21%, N;9.54%
theoretical as based upon $C_{24}H_{18}N_2O_5$
C;57.21%, H;6.16%, N;9.52%

EXAMPLE 2

The procedure of Example 1 was again followed substantially in every detail except that the dimethylformamide was replaced by tetrahydrofuran to obtain the same product as crystals in Example 1.

Yield: 1.05 g (recovery: 71%)
m.p.: 80°–82°C

EXAMPLE 3

δ-carbobenzoxy aminovaleryl aminovaleric acid methyl ester 1 ml of triethylamine was added dropwise with stirring to a cooled solution of 1.26 g of δ-carbobenzoxy aminovaleric acid (5 m mole) and 1.58 g of N-dichloroacetoxy succinimide (7 m more) in 3 ml of dimethylformamide. The mixture was stirred in an ice bath for about 4 hours, followed by an addition of 0.07 ml of water, and then kept in cooled condition for further 40 minutes. Next, the mixed solution of 0.85 g of δ-aminovaleric acid methylester hydrochloride (ca. 5 m mole), 0.7 ml of triethylamine (5 m mole) and 4 ml of dimethylformamide were added thereto with cooling, while stirring for 2.5 hours. The mixture was allowed to stand overnight, then added with 30 ml of water and extracted with ethyl acetate. The ethyl acetate extract was washed with sodium bicarbonate solution, diluted with hydrochloric acid and water respectively and dried over anhydrous sodium sulfate. After removal of the drying agent by filtration, the extract was condensed in vacuo. The sedimented material was separated, washed with ether, dried in desiccator, thus obtaining the product in white crystals.

Yield: 1.37 g (recovery: 75%)
m.p.: 94°–96°C
Elemental analysis:

found;    C;62.87%, H;7.83%, N;7.80%
theoretical as based upon $C_{19}H_{28}N_2O_5$
    C;62.62%, H;7.74%, N;7.69%

EXAMPLE 4

Carbobenzoxy-L-phenylalanylglycine ethyl ester 1.07 ml of triethylamine were added dropwise with cooling to a mixture of 1.5 g of carbobenzoxy-L-phenylalanine (5 m mole) and 1.96 g of N-dichloroacetoxy succinimide (7.5 m mole) in 3 ml of dimethylformamide. After 2 hours, 0.07 ml of water was added with stirring for few minutes, further a mixed solution of glycine ethyl ester hydrochloride (5 m mole), 7 ml of dimethylformamide and 0.7 ml of triethylamine was added thereto and the mixture was stirred for further 2 hours.

After the reaction, 20 ml of water was added and the mixture was extracted with ethyl acetate. The ethyl acetate phase was separated, washed with a 10%-solution of sodium bicarbonate, and diluted with hydrochloric acid and water, then dried with anhydrous sodium sulfate, followed by condensation in vacuo to obtain the product in white crystals.

Yield: 1.55 g (recovery: 81%)
m.p.: found; 108°–111°C; reference; 110°–111°C
Optical rotation:

found;      $[\alpha]_D^{20} = -16.8°$ (c=2.238, ethanol)
reference;  $[\alpha]_D^{20} = -16.9°$ (c=5, ethanol)

Elemental analysis:

found;    C;66.30%, H;6.25%, N;7.33%
theoretical as based upon $C_{21}H_{24}N_2O_5$
    C;65.73%, H;6.19%, N;7.28%

EXAMPLE 5

Carbobenzoxy-L-leucylglycine ethyl ester 2.28 ml of triethylamine were added dropwise with stirring to a cold mixture of 2.65 g of carbobenzoxy-L-leucine (10 m mole) and 3.39 g of N-dichloroacetoxy succinimide (15 m mole) in 3 ml of dimethylformamide. The mixture was stirred for 3 hours, and then added with 0.14 ml of chilled water with continuous cooling and stirring. To this solution, a mixture of 1.39 g of glycine ethyl ester hydrochloride (10 m mole), 14 ml of dimethylformamide and 1.43 ml of triethylamine was added. This reaction mixture was then stirred for further 3 hours. After adding chilled water, the solution was extracted twice with ethylacetate and the extract containing the product was washed with diluted hydrochloric acid, sodium bicarbonate solution and water successively, and dried over anhydrous sodium sultate. After removal of the drying agent by filtration, the ethyl acetate layer was evaporated at a reduced pressure so as to precipitate the product which was finally recrystallized from ethyl acetate/petroleum ether.

Yield: 1.60 g (recovery: 55.1%)
m.p.: 98°–100°C
Optical rotation: $[\alpha]_D^{20} = -25.5$ (c=2.08, ethanol)
Elemental analysis:

found;    C;62.38%, H;7.88%, N;8.06%
theoretical as based upon $C_{16}H_{25}N_2O_5$
    C;61.90%, H;7.45%, N;8.01%

EXAMPLE 6

Carbobenzoxy-L-phenylalanylglycine ethyl ester

N-dichloroacetoxy succinimide in Example 4 was replaced by N-monochloacetoxy succinimide to produce crystals of carbobenzoxy-L-phenylalanylglycine ethyl ester.

Yield: 34%
m.p.: 111°C
Optical rotation: $[\alpha]_D^{24} = -16.1$ (c=1.646, ethanol)

EXAMPLE 7

Benzylpenicillin procaine 0.4 ml of triethylamine (3 m mole) was added to a cooled solution of 0.23 g of N-phenylacetoxy succinimide (1 m mole), prepared in accordance with the aforementioned preparation 5, and 0.21 g of 6-aminiopenicillanic acid (1 m mole) in 3.6 ml of dimethylformamide. The solution was stirred for about 3 hours at room temperature, and then poured into ice water, adjusting the pH to 2 by addition of 1 N-hydrochloric acid. This solution was extracted with methyl isobutyl ketone and the methyl isobutyl ketone layer was separated. This extract was washed with 0.01 N-hydrochloric acid, then extracted twice with 1 ml of 1 mole sodium bicarbonate solution and once with 0.5 ml of the said solution. To the extracts combined together containing the product, benzylpenicillin, there was added 0.27 g of procaine hydrochloride and cooled in an ice water bath, to precipitate benzylpenicillin procaine in white crystals, which were washed then with ethanol and diethyl ether, dried in vacuo, and found to contain β-lactum group upon infrared analysis and to have an activity of 1000 units/mg.

Yield: 400 mg (recovery: 70%)

m.p.: 124°–125°C (dec.)
Elemental analysis:

found      C;59.22%, H;6.92%, N;9.90%, S;5.21%
theoretical as based upon $C_{16}H_{18}N_2O_4S \cdot C_{12}H_{20}N_2O_2 \cdot H_2O$
C;59.17%, H;6.85%, N;9.52%, S;5.54%

EXAMPLE 8

Benzylpenicillin procaine 0.28 ml of triethylamine was added dropwise with stirring to a cold solution of 0.34 g of N-dichloroacetoxy succinimide (1.5 m mole) and 0.136 g of phenylacetic acid (1.0 m mole) 3 ml of dimethylformamide. The mixture was stirred for about 2 hours in an ice water bath and then added with 0.04 ml of water, followed by continuous agitation. Next, a solution of 0.15 g of 6-aminopenicillanic acid (0.7 m mole) in 0.28 ml of triethylamine and 1.5 ml of dimethylformamide was added thereto. The mixture was stirred at room temperature for 3.5 hours. After adjusting the pH to 2.0 and pouring into ice water containing 3 m mole of hydrochloric acid, the solution was extracted with methyl isobutyl ketone. The methyl isobutyl ketone layer was washed with diluted hydrochloric acid and extracted with 1 mole of aqueous sodium bicarbonate solution. Adding 0.19 g of procaine hydrochloride to this extract, the precipitated product formed by cooling was filtered, washed with water, ethanol and diethyl ether, respectively, dried and thus obtained crystals of benzylpenicillin procaine.

Recovery: 63%

EXAMPLE 9

α-carbobenzoxy aminobenzyl penicillin dibenzylethylenediamine 11.2 ml of triethylamine (0.08 mole) were added dropwise to an ice-cold solution of 13.6 g of N-dichloroacetoxy succinimide (0.06 mole) and 11.4 g of α-carbobenzoxyamino phenylacetic acid (0.04 mole) in 30 ml of dimethylformamide. The reaction continued for about 3.5 hours at room temperature, then the reaction mixture was extracted with 250 ml of ethyl acetate and washed successively with water, 1N-sodium bicarbonate solution, 1N-hydrochloric acid and water.

The ethyl acetate layer was dried with anhydrous sodium sulfate. After drying agent was removed by filtration, the ethyl acetate layer was evaporated under reduced pressure. The residue was dissolved in 30 ml of dimethyl formamide, followed by addition of 8.64 g of 6-amino-penicillanic acid (0.04 mole) and further by dropwise addition of 16.8 ml of triethylamine (0.12 mole) with cooling in ice. The resulted clear solution was allowed to warm up to room temperature and to continue the reaction for 2.5 hours, then adjusted the pH to 2 and extracted with 300 ml of methyl isobutyl ketone. The extract was washed with water, followed by adjusting of the pH to 7 by addition of 1N-sodium bicarbonate solution and of dropwise addition of 7.2 g of dibenzylethylenediamine diacetate in water. After precipitated the product was recovered by filtration, washed with water, dried over phosphorus pentoxide in vacuo to give N, N'-dibenzylethylenediamine salt of α-carbobenzoxy aminobenzyl penicillin.

m.p.: 127°–158°C (dec.)
Elemental analysis:

found;      C;64.22%, H;6.07%, N;9.02%
theoretical as based upon $(C_{24}H_{25}N_3O_6S)_2 \cdot C_{14}H_{20}N_2$
C;63.68%, H;5.80%, N;9.29%

EXAMPLE 10

N, N'-dibenzylethylenediamine phenoxymethyl penicillin 16.8 ml of triethylamine (0.12 mole) were added dropwise to an ice cold solution of 9.12 g of phenoxyacetic acid (0.06 mole) and 20.4 g of N-dichloroacetoxy succinimide (0.09 mole) in 50 ml of dimethylformamide. The mixture was stirred for 1.5 hours and then the solution was extracted with 100 ml of ethyl acetate, which is followed by successive washing with 1 N-sodium bicarbonate solution, 1 N-hydrochloric acid and water. After the ethyl acetate layer was dried, it was concentrated and the residue was recrystallized from isopropyl alcohol to give 9.0 g of N-phenoxyacetoxy succinimide (recovery: 60%).

Next, the reaction was continued under cooling for about 2.5 hours with dropwise addition of 12.6 g of triethylamine (0.09 mole) to a solution of 7.49 g of N-phenoxyacetoxy succinimide (0.03 mole) and 6.48 g of 6-aminopenicillanic acid (0.03 mole) in 100 ml of dimethylformamide. The solution was adjusted to pH 2.0, extracted with 150 ml of methyl isobutyl ketone, and followed by extraction with 1 N-sodium bicarbonate solution. The extract was adjusted to pH 7 and lyophilized. 10 g of N, N'-dibenzylethylenediamine diacetate solution were added to 11.7 g of this lyophilized powder and filtered and the precipitate was washed with water, dried in vacuo to give N, N'-dibenzylethylenediamine phenoxymethyl penicillin. (recovery: 60%).

m.p.: 95°–97°C
Elemental analysis:

found;      C;59.01%, H;5.89%, N;8.25%
theoretical as based upon $(C_{16}H_{18}N_2O_5S)_2 \cdot C_{16}H_{20}N_2$
C;61.30%, H;5.96%, N;8.95%

EXAMPLE 11

N, N'-dibenzylethylenediamine phenoxyethyl penicillin

In the process of Example 10, the phenoxyacetic acid was replaced by phenoxypropionic acid to produce N, N'dibenzylethylenediamine phenoxyethyl penicillin. (recovery: 62.5%)

m.p.: 93°–100°C
Elemental analysis:

found;      C;60.61%, H;6.20%, N;8.28%
theoretical as based upon $(C_{17}H_{20}N_2O_5S)_2 \cdot C_{16}H_{20}N_2$
C;60.83%, H;6.19%, N;8.67%

EXAMPLE 12

N, N'-dibenzylethylenediamine phenoxypropyl penicillin

In an Example 10 the phenoxyacetic acid was replaced by phenoxybutyric acid to produce N, N'-dibenzylethylenediamine phenoxypropyl penicillin. (recovery: 50.3%)

Elemental analysis:

found; C;63.10%, H;6.38%, N;8.82%
theoretical as based upon $(C_{18}H_{22}N_2O_5S)_2 \cdot C_{16}H_{20}N_2$
C;62.63%, H;6.42%, N;8.43%

Example 13

In the process of Example 10, the dichloroacetoxy succinimide and phenoxyacetic acid were replaced by monochloroacetoxy succinimide and phenoxybutyric acid respectively to produce the same product as obtained in Example 12.

Example 14

N,N'-dibenzylethylenediamine-3-(o-chlorophenyl)-5-methyl-4-isoxazolyl penicillin 14.0 ml of triethylamine (0.1 mole) were added dropwise under ice cooling to a solution of 11.85 g of 3-(o-chlorophenyl)-5-methyl-4-isoxazol carboxylic acid (0.075 mole) in 30 ml of dimethylformamide. The mixture was reacted with stirring in an ice water bath for 1 hour and then at room temperature for 3 hours. The solution was extracted twice with total 300 ml of ethyl acetate, subsequently washed with water, 1 N-sodium bicarbonate solution, 1 N hydrochloric acid and water, respectively. The washed solution was dried over anhydrous sodium sulfate.

After removal of the drying agent by filtration, the ethyl acetate layer was evaporated in vacuo and the residue was dissolved in 25 ml of dimethylformamide, to which is added then 6.5 g of 6-amino-penicillanic acid (0.03 mole) and 2.45 g of 2-methylimidazole under cooling to react with each other for 3 hours. The reacted solution was allowed to stand overnight at room temperature, adjusted to pH 2.0 in an ice water bath and extracted with 100 ml of diethyl ether. The ether solution was then extracted with 30 ml of 1N-sodium bicarbonate solution and 5.4 g of N,N'-dibenzylethylenediamine diacetate in water was added thereto. After cooling off the reaction mixture, the filtered precipitate was washed with water and dried to obtain N, N'-dibenzyl-ethylenediamine-3-(o-chlorophenyl)-5-methyl isoxazolyl penicillin.

Yield: 7.7 g (recovery: 45%)
m.p.: 55°–64°C
Elemental analysis:

found: C;58.25%, H;5.46%, N;9.55%, Cl;6.34%
theoretical as based upon $(C_{19}H_{18}N_3O_5SCl)_2 \cdot C_{16}H_{20}N_2$
C;58.33%, H;5.04%, N;10.08%, Cl;6.39%

EXAMPLE 15

N,N'-dibenzylethylenediamine α-methoxy-3, 4-dichlorobenzyl penicillin

In the process of Example 10, the phenoxyacetic acid was replaced by α-methoxy-3, 4-dicholorophenylacetic acid to produce N, N'-dibenzylethylenediamine α-methoxy-3, 4-dichlorobenzyl penicillin. (recovery: 45%)
Elemental analysis:

found: C;56.08%, H;5.23%, N;5.31%, Cl;13.42%
theoretical as based upon $(C_{17}H_{18}NO_5SCl_2)_2 \cdot C_{16}H_{20}N_2$
C;55.65%, H;5.19%, N;5.19%, Cl;13.15%

EXAMPLE 16

N,N'-dibenzylethylenediamine 2-ethoxy-1-naphtyl penicillin

In the process of Example 14, 3-(o-chlorophenyl)-5-methyl-4-isoxazole carboxylic acid was replaced by 2-ethoxy-1-naphthoic acid to produce N,N'-dibenzylethylenediamine 2-ethoxy-1-naphthyl penicillin. (recovery: 41.0%)
Elemental analysis:

found: C;66.38%, H;6.11%, N;6.66%
theoretical as based upon $(C_{21}H_{22}N_2O_5S)_2 \cdot C_{16}H_{20}N_2$
C;65.89%, H;6.05%, N;6.81%

Example 17

N,N'-dibenzylethylenediamine 6-(carbobenzoxyglycly) amino-penicillanic acid

In the process of Example 10, the phenoxyacetic acid was replaced by carbobenzoxyglycine to produce N,N'-dibenzylethylenediamine-6-(carbobenzoxyglycyl)-aminopenicillanic acid. (recovery: 70.7%)
Elemental analysis:

found: C;58.34%, H;5.95%, N;10.87%
theoretical as based upon $(C_{18}H_{21}N_3O_6S)_2 \cdot C_{16}H_{20}N_2$
C;59.19%, H;5.88%, N;10.62%

EXAMPLE 18

N,N'-dibenzylethylenediamine 6-(carbobenzoxyphenylalanyl)-aminopenicillanic acid In the process of Example 10, phenoxyacetic acid was replaced by carbobenzoxyphenylalanine to produce N,N'-dibenzylethylenediamine-6-(carbobenzoxyphenylalanyl)-aminopenicillanic acid. (recovery: 72.3%)
Elemental analysis:

found: C;64.69%, H;6.06%, N;9.00%
theoretical as based upon $(C_{25}H_{27}N_3O_6S)_2 \cdot C_{16}H_{20}N_2$
C;64.17%, H;5.99%, N;9.07%

EXAMPLE 19

N,N'-dibenzyethylenediamine-6-(carbobenzoxyseryl)-aminopenicillanic acid

In the process of Example 10, the phenoxyacetic acid was replaced by carbobenzoxyserine to produce N,N'-dibenzylethylenediamine-6-(carbobenzoxyseryl)-aminopenicillanic acid. (recovery: 60.7%)
Elemental analysis:

found: C;57.71%, H;6.17%, N;9.93%
theoretical as based upon $(C_{19}H_{24}N_3O_7S)_2 \cdot C_{16}H_{20}N_2$
C;58.05%, H;6.09%, N;10.03%

EXAMPLE 20

N,N'-dibenzylethylenediamine-6-(carbobenzoxyalanyl)-aminopenicillanic acid

In the process of Example 10, the phenoxyacetic acid was replaced by carbobenzoxyalamine to produce N,N-

'-dibenzylethylenediamine-6-(carbobenzoxyalanyl)-aminopenicillanic acid. (recovery: 75.8%)
Elemental analysis:

found:   C;60.45%, H;6.01%, N;10.61%
theoretical as based upon $(C_{19}H_{23}N_3O_6S)_2 \cdot C_{16}H_{20}N_2$
   C;59.87%, H;6.09%, N;10.34%

EXAMPLE 21

N,N'-dibenzylethylenediamine-6-myristoyl-aminopenicillanic acid

In the process of Example 10, the phenoxyacetic acid was replaced by myristic acid to produce N,N'-dibenzylethylenediamine-6-myristoyl-aminopenicillanic acid. (recovery: 55.4%)
Elemental analysis:

found;   C;65.88%, H;8.03%, N;7.59%
theoretical as based upon $(C_{22}H_{38}N_2O_4S)_2 \cdot C_{16}H_{20}N_2$
   C;66.53%, H;7.94%, N;7.76%

EXAMPLE 22

N,N'-dibenzyethylenediamine-6-lauroyl-aminopenicillanic acid

In the process of Example 10, the phenoxyacetic acid was replaced by lauric acid to produce N,N'-dibenzylethylenediamine-6-aminopenicillanic acid. (recovery: 62.0%)
Elemental analysis:

found;   C;65.33%, H;8.53%, N;7.94%
theoretical as based upon $(C_{20}H_{34}N_2O_4S)_2 \cdot C_{16}H_{20}N_2$
   C;64.85%, H;8.49%, N;8.10%

EXAMPLE 23

N,N'-dibenzylethylenediamine-6-caproyl-aminopenicillanic acid

In the process of Example 10, the phenoxyacetic acid was replaced by caproic acid to produce N,N'-dibenzylethylenediamine-6-caproly-aminopenicillanic acid. (recovery: 58.0%)
Elemental analysis:

found;   C;61.38%, H;7.44%, N;9.48%
theoretical as based upon $(C_{14}H_{22}N_2O_4S)_2 \cdot C_{16}H_{20}N_2$
   C;60.81%, H;7.37%, N;9.67%

Various changes and modifications of the invention can be made and, to the extent that such variations incorporate the spirit of this invention, they are intended to be included within the scope of the appended claims.
What is claimed is:

1. A process for the production of a deptide having the general formula:

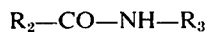

wherein:

$R_2$ is a member selected from the group consisting of α-lower alkyl-, phenyl- and benzyl- α-amino acetic acid residues N-protected with carbo-benzoxy groups; and $R_3$ is an amino acid residue, said process comprising: reacting in an inert organic solvent at a temperature of from about −5°C to room temperature, a first compound having the general formula:

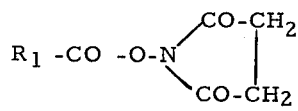

wherein:

$R_1$ is a member selected from the group consisting of a monochloromethyl and a dichloromethyl group, with a second compound having the following general formula:

wherein:

$R_2$ has the same meaning as hereinbefore described, wherein the molar ratio of said first compound to said second compound is from about 1.0 to about 2 moles of said first compound per 1 mole of said second compound, said reaction being conducted in the presence of from about 1.0 to about 3.0 moles of a tertiary organic amine per 1 mole of said second compound to yield a succinimide ester compound having the general formula:

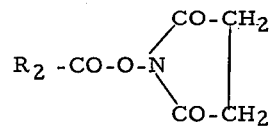

wherein:

$R_2$ has the meaning hereinbefore described; and subsequently reacting said succinimide compound with an amino compound in a ratio of from 1 to 2 moles of said succinimide compound per 1 mole of said amino compound, said amino compound being represented by the following general formula:

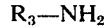

said reaction being conducted in the presence of from 1 to 3 moles of a tertiary organic amine per 1 mole of said amino compound wherein:

$R_3$ has the same meaning hereinbefore described, in said inert organic solvent at a temperature of from about −2° C to room temperature to thereby yield the desired dipeptide expressed by said initial formula.

2. The process of claim 1, wherein said peptide is oxytocin.

* * * * *